(12) United States Patent
Fishkin et al.

(10) Patent No.: US 8,380,732 B2
(45) Date of Patent: Feb. 19, 2013

(54) SYSTEMATIC PROCESS FOR CREATING LARGE NUMBERS OF RELEVANT, CONTEXTUAL MARGINAL COMMENTS BASED ON EXISTING DISCUSSIONS OF QUOTATIONS AND LINKS

(75) Inventors: Robert Edward Fisher Fishkin, Stanford, CA (US); Benjamin Ethan Taitelbaum, Charlottesville, VA (US)

(73) Assignee: ReFrame-It, Inc, Stanford, CA (US)

( * ) Notice: Subject to any disclaimer, the term of this patent is extended or adjusted under 35 U.S.C. 154(b) by 0 days.

(21) Appl. No.: 13/086,103

(22) Filed: Apr. 13, 2011

(65) Prior Publication Data

US 2011/0252052 A1    Oct. 13, 2011

Related U.S. Application Data

(60) Provisional application No. 61/323,653, filed on Apr. 13, 2010.

(51) Int. Cl.
*G06F 17/30* (2006.01)
(52) U.S. Cl. .................. 707/765; 707/769; 707/999.003
(58) Field of Classification Search .................. 707/769, 707/999.003
See application file for complete search history.

(56) References Cited

U.S. PATENT DOCUMENTS

| | | | |
|---|---|---|---|
| 7,620,648 B2 * | 11/2009 | Cragun et al. | 1/1 |
| 7,801,951 B2 | 9/2010 | Fishkin et al. | |
| 2002/0019856 A1 * | 2/2002 | Bezos et al. | 709/218 |
| 2003/0204490 A1 * | 10/2003 | Kasriel | 707/2 |
| 2005/0257158 A1 * | 11/2005 | Lombardo | 715/751 |
| 2008/0033790 A1 * | 2/2008 | Nickerson et al. | 705/10 |
| 2008/0059286 A1 * | 3/2008 | Nickerson et al. | 705/10 |
| 2008/0209361 A1 * | 8/2008 | Nickerson et al. | 715/808 |
| 2009/0199103 A1 * | 8/2009 | Brantley et al. | 715/733 |
| 2009/0204882 A1 * | 8/2009 | Hollander et al. | 715/230 |
| 2010/0057569 A1 * | 3/2010 | Cantelmo et al. | 705/14.55 |
| 2010/0106485 A1 * | 4/2010 | Lu et al. | 704/9 |
| 2010/0241968 A1 * | 9/2010 | Tarara et al. | 715/751 |
| 2011/0040787 A1 * | 2/2011 | Cierniak et al. | 707/770 |

* cited by examiner

*Primary Examiner* — Miranda Le
(74) *Attorney, Agent, or Firm* — St. Onge Steward Johnston & Reens LLC (57) ABSTRACT

A system for searching digital works for comments includes search software capable of searching web pages for comments about a referenced work. In one embodiment, the software searches a web page for delimiters such as quotes that are in proximity to a link to another web page. The software stores any comments in proximity to the quoted content for use in a comment display system where it may be displayed as comment marginalia.

21 Claims, 5 Drawing Sheets

SYSTEMATIC PROCESS FOR CREATING LARGE NUMBERS OF RELEVANT, CONTEXTUAL MARGINAL COMMENTS BASED ON EXISTING DISCUSSIONS OF QUOTATIONS AND LINKS

CROSS-REFERENCE TO RELATED APPLICATIONS

This patent application claims the benefit, under 35 U.S.C. §119 (e), of U.S. Provisional Patent Application Ser. No. 61/323,653, filed on Apr. 13, 2010, the content of which is incorporated herein by reference in its entirety.

FIELD OF THE INVENTION

The present teachings relate generally to the collecting and displaying of comments in reference to digital media and, more particularly, to searching digital media for existing comments.

BACKGROUND OF THE INVENTION

The ability to display comments alongside digital media applies to digital works such as web pages, although not limited thereto. For example, U.S. Pat. No. 7,801,951, assigned to Reframe-It, Inc., incorporated herein by reference in its entirety, discloses such systems and methods. These systems and methods are discussed below with reference to the disclosed systems and methods for searching digital works for existing comments.

In one embodiment, a user may visit a web page and a web browser will open a window on one side of the computer screen focused on the web page. On the other side of the screen, another window may be opened for displaying textual, video and audio comments created by users that refer to the web page, although not limited thereto. The two windows can be coordinated such that when a user scrolls down in the web page window, the comment window will scroll to a corresponding degree so that they remain in sync.

Such a system provides the ability for users to enter comments in the comment window, which may be in reference to a particular point on the web page. User comments may be stored in a database accessible over a network. In such a way, as a user navigates web pages, available comments for those web pages will always be displayed alongside the web page content.

However, there already exists a large number of comments for web pages which are publicly available on networks such as the Internet. Although publicly available, these comments are not necessarily available to users of the comment system because they were not entered through the system's interface. In addition, these comments are spread throughout a network (e.g., Internet), such that it would be impractical to input them into the system manually. Therefore, it would be beneficial to have a superior system and method for creating large numbers of relevant, contextual marginal comments based on existing discussions of quotations and links.

SUMMARY OF THE INVENTION

The needs set forth herein as well as further and other needs and advantages are addressed by the present embodiments, which illustrate solutions and advantages described below.

The system of the present embodiment includes, but is not limited to, a server, a database in electronic communication with the server, quote search software executing on a computer readable medium for searching the plurality of digital works for quotes (Q) which are in proximity to a reference to another digital work (L), identification software executing on a computer readable medium for identifying content in proximity to a quote Q, referred to as (BA), reference search software executing on a computer readable medium for searching the another work referenced by L for the corresponding quote Q in order to determine a reference point in the work, referred to as (R), and storage software executing on a computer readable medium for storing at least one of Q, L, BA and R in the database. The quote search software searches for quotes by searching for some delimiter and searches the plurality of digital works over a network.

In one embodiment, the system may further comprise non-reference quote search software executing on a computer readable medium for searching the plurality of digital works for quotes (Q') which are not in proximity to a reference to another digital work, non-reference work search software executing on a computer readable medium for searching for quotes Q' in proximity to one or more reference points R, non-reference identification software executing on a computer readable medium for identifying content in proximity to quotes Q', referred to as (BA'), and non-reference storage software executing on a computer readable medium for storing at least one of Q', L, BA' and R in the database. The non-reference quote search software searches for quotes by searching for some delimiter and searches the plurality of digital works over a network.

The method of the present embodiment includes, but is not limited to, the steps of providing a server, providing a database in electronic communication with the server, quote searching, on a computer, the plurality of digital works for quotes (Q) which are in proximity to a reference to another digital work (L), identifying, on a computer, content in proximity to a quote Q, referred to as (BA), reference searching, on a computer, the another work referenced by L for the corresponding quote Q in order to determine a reference point in the work, referred to as (R), and storing at least one of Q, L, BA and R in the database. The step of quote searching comprises searching for some delimiter and searching the plurality of digital works over a network.

In one embodiment, the method may also comprise the steps of non-reference quote searching, on a computer, the plurality of digital works for quotes (Q') which are not in proximity to a reference to another digital work, non-reference work searching, on a computer, for quotes Q' in proximity to one or more reference points R, non-reference identifying, on a computer, content in proximity to quotes Q', referred to as (BA'), and storing at least one of Q', L, BA' and R in the database. The step of non-reference quote searching comprises searching for some delimiter and searching the plurality of digital works over a network.

In another embodiment, the system comprises, but is not limited to, a server, a comment database, a comment display application having a graphical user interface for displaying comments in relation to a web page, quote search software executing on a computer readable medium for searching a plurality of web pages for quotes (Q) which are in proximity to a reference to another digital work (L), identification software executing on a computer readable medium for identifying content in proximity to a quote Q, referred to as (BA), reference search software executing on a computer readable medium for searching the another work referenced by L for the corresponding quote Q in order to determine a reference point in the work, referred to as (R), and storage software executing on a computer readable medium for storing at least one of Q, L, BA and R in the comment database. The quote search software searches for quotes by searching for a quote character and searches the plurality of web pages over the Internet. The comment display application displays a stored comment BA in reference to a digital work L.

In still another embodiment, the system comprises, but is not limited to, a server, a database in electronic communication with the server, reference search software executing on a computer readable medium for searching the plurality of digital works for references to another digital work (L), identification software executing on a computer readable medium for identifying content in proximity to a reference L, referred to as (A), content parsing software executing on a computer readable medium for parsing content A for identifiable elements (E), work parsing software executing on a computer readable medium for parsing referenced work L for identifiable elements (E'), comparison software executing on a computer readable medium for comparing elements E and E' in order to determine a reference point in referenced work L, referred to as (R), and storage software executing on a computer readable medium for storing at least one of A, L, and R in the database. The reference search software searches the plurality of digital works over a network.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

The systems and methods of U.S. Pat. No. 7,801,951, assigned to Reframe-It, Inc. and incorporated herein by reference in its entirety, allow users to comment on the content (e.g., text, images, video, sounds, etc.) of any digital media (e.g., web page, etc.) without the permission of the digital media owner. In such a way, the system has the ability to transform the nature of the publicly-available information such as that found on the Internet by creating a "virtual margin" alongside any web page. In this virtual margin users can post comments to be shared with other users and read what others have written. Instead of being moderated/censored by the web site owner, the crowd of users may self-regulate itself with the use of a ratings system.

Such a system is easy, accessible and empowering because it enables in-stream-of-thought commenting. This may be useful for communities of people who interact around particular web content. In addition, it may be the ideal tool for internal communications within communities and movements whose boundaries are vague, varied and constantly shifting because it accommodates disparate levels of engagement. It may be particularly well-suited for small ad-hoc communities networking around the task of interpreting a paragraph, for example. As a result, the comment system is not limited to the internet or to web pages. Users may time-shift their community engagement so that it naturally flows around efficient moments of maximal shared interest—the moments when community members are looking at the same sentence and reacting to it.

With prior systems, to discuss a specific idea or excerpt from a web page, one would typically email the URL, attempt to identify the location of the point of interest in the web page, and then explain its interest. However, the recipient often misinterprets what the sender found important because the commentary within the email is out of the context of the specific reference point.

The comment system is a versatile technology that can also create a secure private space in which employees of a corporation or members of an organization can privately discuss external websites of shared concern. Accordingly, it is a tool that businesses can use for internal communications alongside the public web, that associations can use to deepen community engagement, and a technology that consumers can benefit from and enjoy.

For example, the comment system may offer the public a space alongside web pages where the content can be challenged and discussed without obstruction from the content owner. This allows people with relevant expertise to confirm good information and challenge information that is inaccurate, misleading and deceptive, so that the broader community will not unwittingly fall victim to it. This provides a level of transparency without censorship. As both a technology and as a community, such a system seeks to become the "transparency engine for the web."

As discussed in U.S. Pat. No. 7,801,951, the comment system may be implemented using a software application such as a browser extension, although not limited thereto. In this way, a user may visit a web page and the web browser may open a browser window focused on the web page on one side of the screen. On the other side of the screen, another browser window (or some other "window" provided by software) may be opened for displaying "comments." This second window may be its own full browser window, or it may be a part of a single browser window that appears to users to act like a second browser window in one or more capacities, although not limited thereto.

This second window (also referred to as "comment window") may be coordinated with the first window such that textual, video, audio, etc. comments which refer to the web page will be displayed in the second window. The two windows may also be coordinated such that when a user scrolls down on the web page window, the comment window will scroll to a corresponding degree so that they remain in sync.

Figure 1:
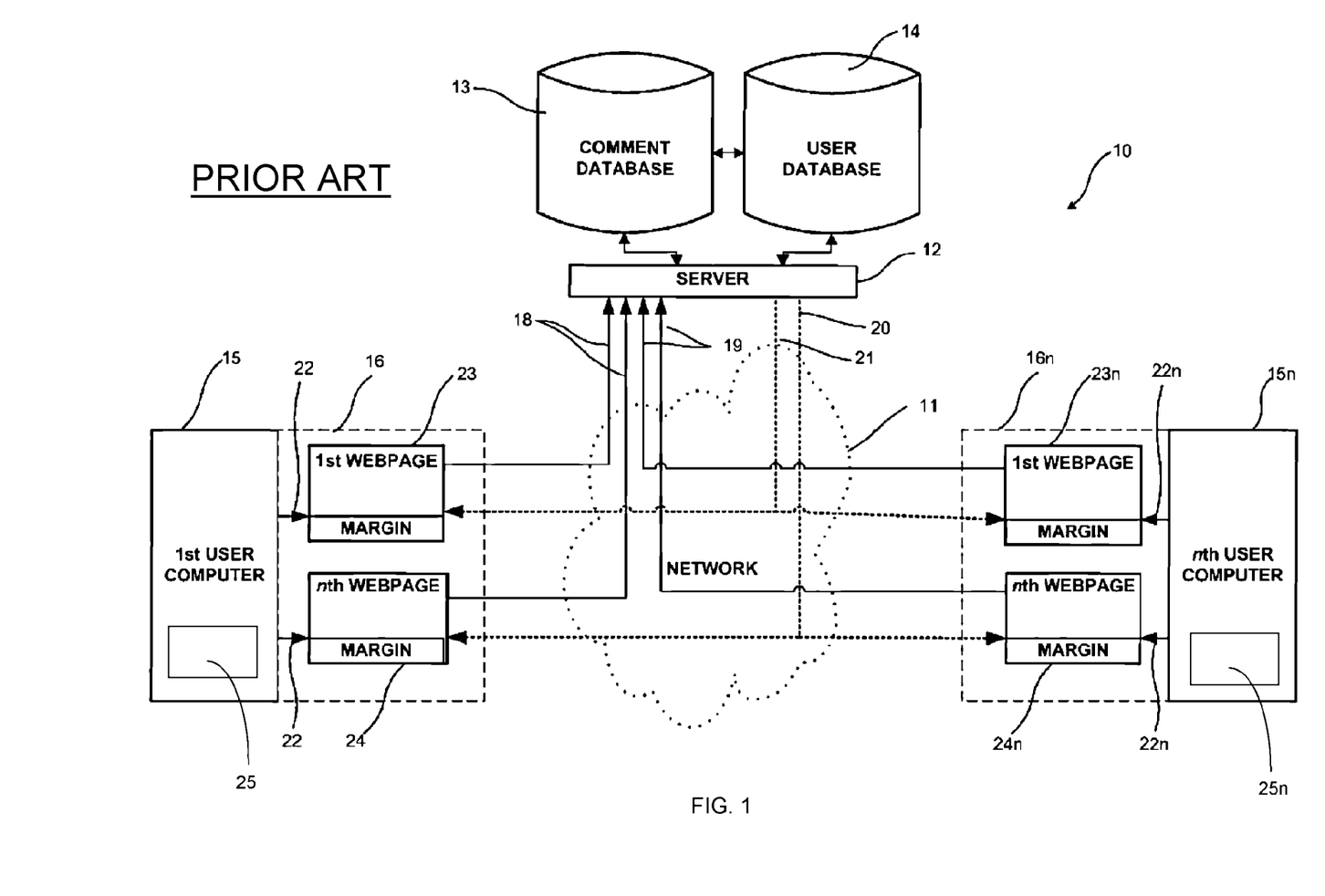
FIG. 1 is a schematic diagram of one embodiment of a known comment system.

Referring to FIG. 1, shown is a schematic diagram of one embodiment of a known comment system 10. The system 10 may provide information viewable in a web browser according to the present teachings, although not limited thereto. The system 10 may operate through a communication network 11, and comprise a server 12, data storage 13 and 14, and a plurality of user computers 15, 15*n*, although not limited thereto. The system 10 may be advantageously employed using communication networks 11 of various sizes, including a network as large as the Internet and as small as a local network in a home or business, although not limited thereto.

In one embodiment, each user computer 15, 15*n* may include a web browsing program (e.g., web browser, etc.), shown as reference numerals 16 and 16*n*. It is to be understood by one of ordinary skill in the art that systems according to the present teachings do not require that each user of the system 10 utilize the same web browser, but that different users can utilize different web browsers and the present teachings are not limited to any particular web browser.

User computers 15, 15*n* may communicate with the server 12 via the network 11. Such communication is shown by arrows 18, 19, 20, 21. Each user computer 15, 15*n* may include an application 25, 25*n* executing thereon as part of the system 10, which processes user comments input into the system 10, retrieves comments stores therein, and facilitates the display of the comments on the user's computer 15, 15*n*. Such applications 25, 25*n* may include web browser "plugins" which may run independently of the web browser. In another embodiment, applications 25, 25*n* may be independent of any browser and the present teachings are not limited to any particular embodiment disclosed herein.

A user of the system 10 may register and install the relevant application 25, 25*n* on his/her computer 15, 15*n*. The user may then log into the system 10 and the application 25, 25*n* may run simultaneously and in conjunction with the web browser 16, 16*n*. The user may view a first web page 23, 23*n* which is downloaded by the web browser 16, 16*n* from a third party server (not shown) located somewhere on the communication network 11. The first web page 23, 23*n* may then be displayed by the web browser 16, 16*n*.

Upon viewing the web page 23, 23*n*, the user may notice a portion of text, a picture, or other content that piques his/her interest. In one embodiment, the user may highlight the portion of the web page 16, 16*n* that is of interest, using the mouse, keyboard, or other suitable input peripheral. The highlighted portion of the web page 16, 16*n* may become a reference point, which may be recorded by the user's application 25, 25*n*. The user may then enter a comment. A comment may include textual information from the clipboard or entered through a keyboard, audio files, video files, and the like, or any combination thereof. Arrows 22, 22*n* indicate comment information being input by the user. The user may "surf" the web to the next web page 24, 24*n* and be provided comments for that page and the ability to enter comments in a similar fashion.

As described above, the system 10 provides a unique and powerful way to store and display comments relating to a web page 16, 16*n*. However, there already exists on the Internet, for example, an incredible amount of comments that are not accounted for by the system 10. Therefore, it would be desirable to search for these comments and add them to the system 10 such that they can be displayed to users. Having comments already in place when a new system is deployed (e.g., before system users add them) enables the system to immediately grab the interest of the new users, since users will already have access to relevant comments for web pages 16, 16*n* the user may be visiting.

Figure 2:
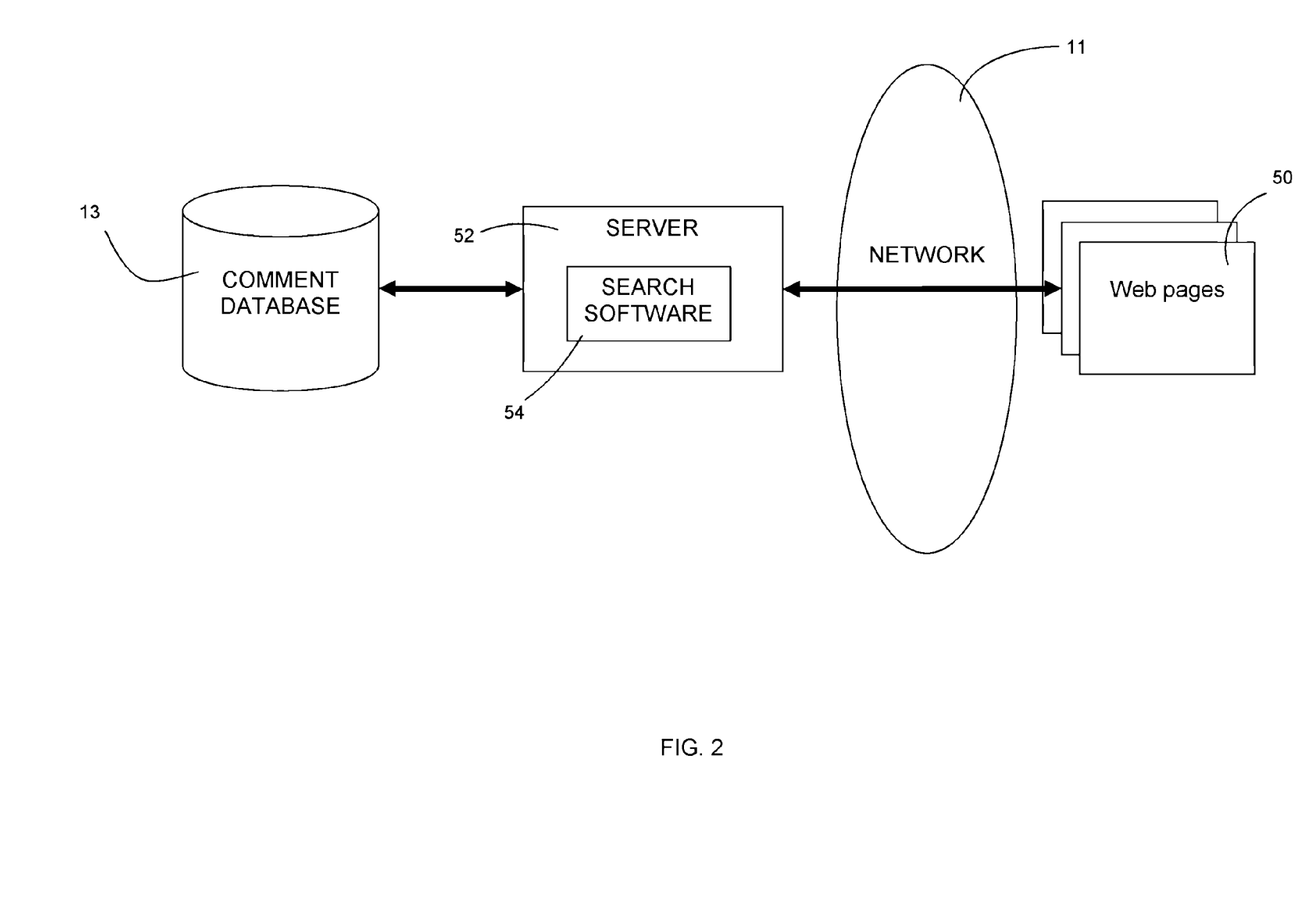
FIG. 2 is a schematic diagram of one embodiment of the comment search system according to the present teachings.

Referring to FIG. 2, shown is a schematic diagram of one embodiment of the comment search system according to the present teachings. As shown, a server 52 having search software 54 may access digital works such as web pages 50 over a network 11 such as the Internet, although not limited thereto. The search software 54 may search the web pages 50 for quotes to other web pages, which the search software 54 may store in the comment database 13 for use in the system 10 shown in FIG. 1. The search software 54 may comprise one or more distinct software applications or components, as described in the exemplary embodiments of FIGS. 3 and 4, below.

Figure 3:
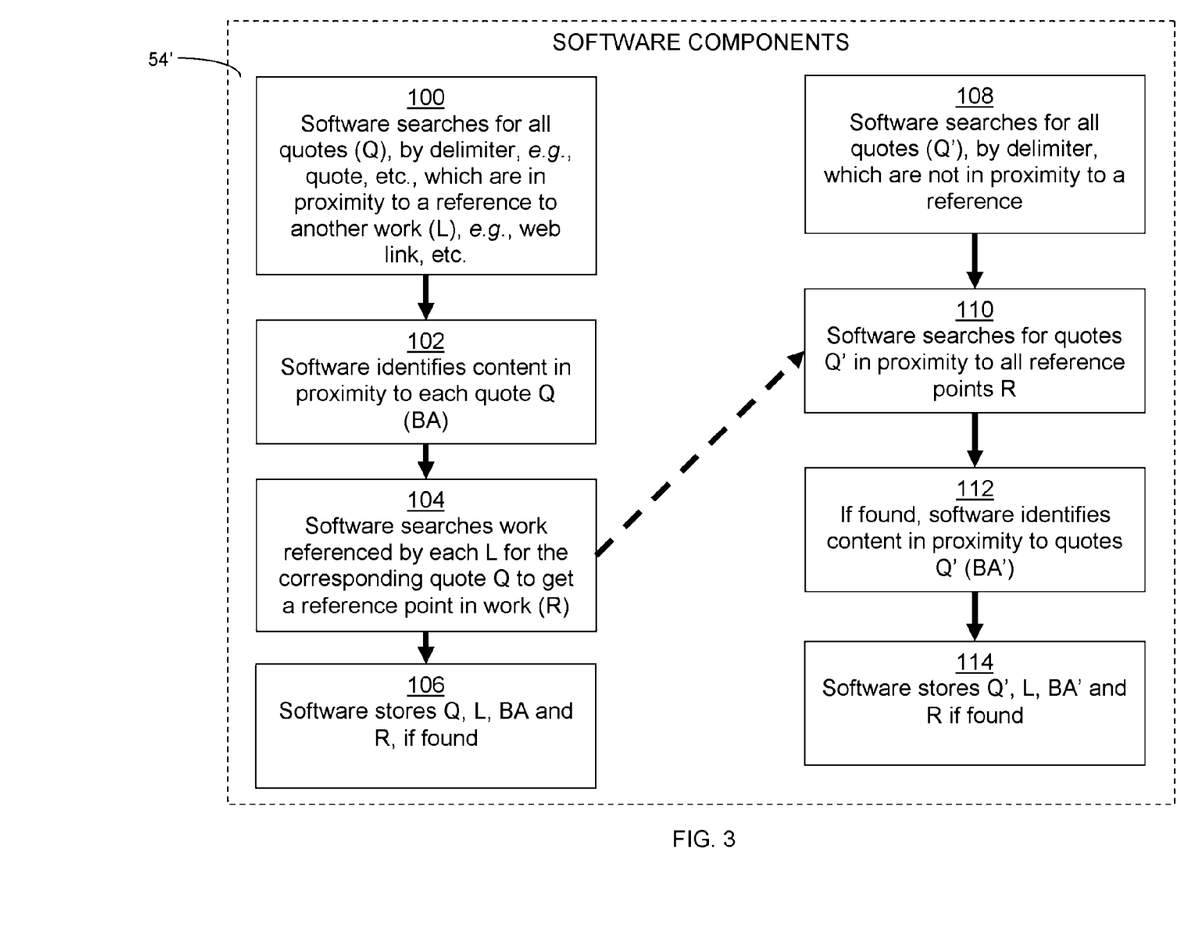
FIG. 3 is a schematic diagram of one embodiment of the software in FIG. 2 having various components for searching for comments according to a first method.

Referring to FIG. 3, shown is a schematic diagram of one embodiment of the software 54' in FIG. 2 having various components for searching for comments according to a first method. Each of the various components 100, 102, 104, 106, 108, 110, 112, 114 are described by their functionality, which may be provided in software independently of each other or aggregated into a single application. First, a search may be conducted for all digital works (e.g., web pages, etc.) that have some delimiter indicating a quotation and that are in proximity to a reference to another work 100. For example, although not limited thereto, the delimiter may be quote characters (or indentations, parentheses, or some other set of characters) and in one embodiment the reference may be web link, although not limited thereto. In such a way, the system may search the Internet for every pair of quotation marks that are within some number of words (e.g., 20 words, etc.) or some distance (e.g., 100 characters, etc.) of a link to another web page, although not limited thereto. Such a search will likely find comments about the web page, which may be incorporated into the comment system 10 shown in FIG. 1.

The set of all quoted content (which may also include video, pictures or any other medium) in proximity to a reference may be referred to as "Q" and each individual quote may be referred to as Q1, Q2, etc. The references may be referred to as "L" and each individual reference (e.g., link, etc.) may be referred to as L1, L2, etc. In such a way, each Q may have a corresponding L. In one embodiment, although not limited thereto, the search for references may include not only direct links, but also links addressed in footnotes, etc., which can be followed to the referenced work.

Next, the system may identify the content surrounding each quote Q1, Q2, etc. 102. This text is typically the text that "comments" on, or otherwise discusses the work being referred to with reference L1, L2, etc. For example, although not limited thereto, thirty words before and after every quote Q1, Q2, etc. may be identified. It is to be appreciated that any number of words before and after the quote may be identified (e.g., 10, 20, 30, 40, 50, 60, etc.) as one skilled in the art would appreciate and the present teachings are not limited to this particular embodiment. In one embodiment, this identification may round to the nearest sentence so that whole sentences are identified. This content may be referred to as Before and After (BA), and each Q1, Q2, etc. may have a reference L1, L2, etc. and associated content BA1, BA2, etc.

Next, each referenced work (e.g., "other" work referenced by L1, L2, etc.) may be searched for the quoted language Q1, Q2, etc. 104. This finds a specific reference point in the work, which may be referred to as "R", so that the comment can be tied to a particular position in the referenced work (e.g., position on a web page, etc.).

Next, each Q, L, BA and R that were found may be stored 106. Information is typically stored in the comment database 13 (shown in FIG. 2). In this way, for example, BA1 may be associated with the work L1 at position R1. When a user utilizing the system 10 shown in FIG. 1 goes to the web page referenced by L1, comment BA1 may be provided as a marginal comment at position R1 within that web page. The search method may then be repeated such that all quotes on the Internet that refer to a web page can be linked to the web page automatically and within the bounds of fair use.

The preceding method of searching for comments is directed to works having a quote Q in proximity to a reference L. However, it is also possible to search all other quotes (e.g., those not in proximity to a reference to another work) in order to tie them to a referenced work. In one embodiment, although not limited thereto, it may be preferable to first search for all quotes, regardless of the presence of a delimiter and then perform the various steps 100, 102, 104, 106, 108, 110, 112, 114 based upon whether the quote is in proximity to a delimiter. In another embodiment only one set of functionality (e.g., 100, 102, 104, 106 or 108, 110, 112, 114) may be performed, although not limited thereto.

A search may be performed for all delimiters (e.g., quote character(s), etc.) that are not in proximity to a reference 108. These quotes may be referred to as Q' and each individual quote may be referred to as Q'1, Q'2, etc. For example, Q' may identify all quotes not within twenty words of a reference. It is to be appreciated that any number of words may be used (e.g, 10, 20, 30, 40, 50, 60, etc.) as one skilled in the art would appreciate and the present teachings are not limited to this particular embodiment. In one embodiment, the reference points R determined by software 104 may be used to look for the quoted language Q'1, Q'2, etc. found by software 108. It may be preferable to search in proximity to reference points R because these are already known to the system and, because they are also known to be quoted by quotes Q, also have a higher probability of being quoted by quotes Q'.

A search of content in proximity to the reference points (R) for quotes Q'1, Q'2, etc. may be performed 110. For example, the system may search within fifty words of each reference point R, although not limited thereto. If the quoted information (e.g., text, picture, video, sound, etc.) is found in the reference, content in proximity to the quote Q'1, Q'2, etc. may be identified 112. This identified content may be referred to as BA', such that each quote Q'1, Q'2, etc. may have a reference point R and before and after identified content BA'1, BA'2, etc. This information may be stored 114 in the comment database 13 (shown in FIG. 2). In this way, by comparing the quoted content (may be limited to quotes more than ten words long, etc.) it is possible to link the interpretation and discussion that surrounds these previously un-located quotes to the referenced works R which were previously found.

Figure 4:
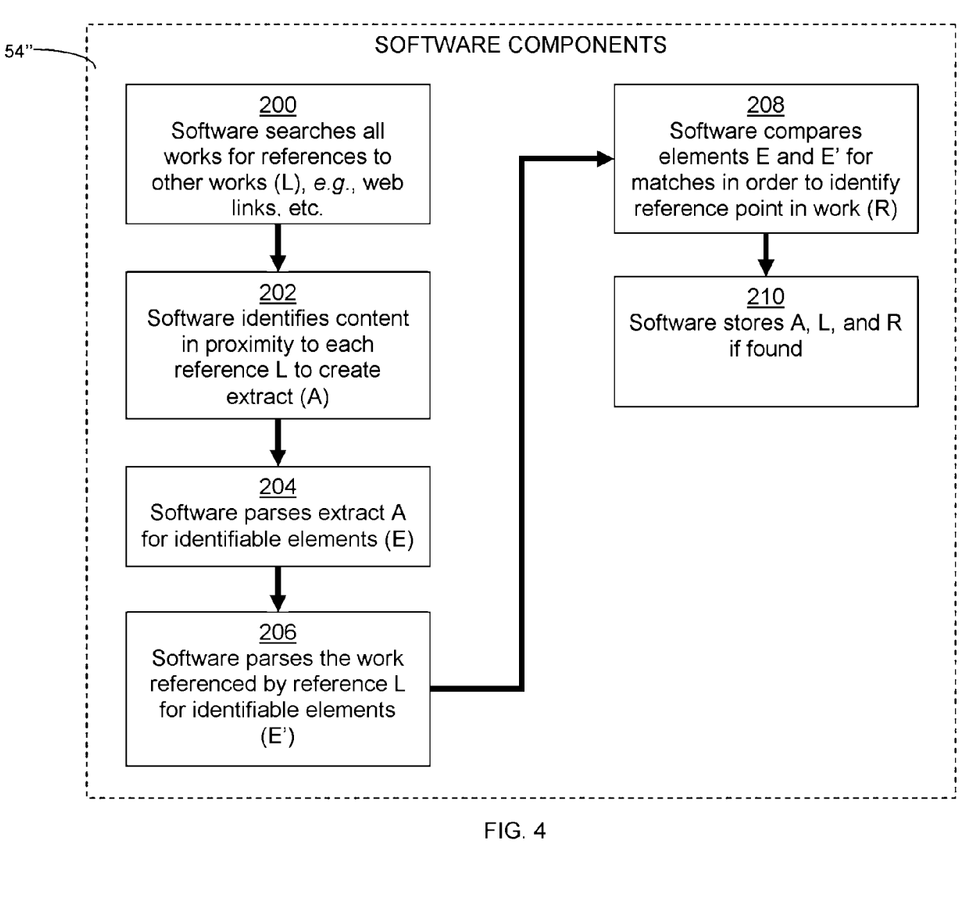
FIG. 4 is a schematic diagram of another embodiment of the software in FIG. 2 having various components for searching for comments according to a second method.

Referring to FIG. 4, shown is a schematic diagram of another embodiment of the software 54" in FIG. 2 having various components for searching for comments according to a second method. Each of the various components 200, 202, 204, 206, 208, 210 are described by their functionality, which may be provided in software independently of each other or aggregated into a single application. First, all digital works (e.g., web pages, etc.) may be searched for a reference to another work 200. For example, although not limited thereto, the reference may be a web link, although not limited thereto. In such a way, the system may search the Internet for every web page having a link to another web page, although not limited thereto. The references may be referred to as "L" and each individual link/reference may be referred to as L1, L2, etc.

Next, content within a predetermined proximity to each reference may be identified (e.g., one sentence before and after each link, etc.) 202. This content likely discusses the link and is relevant commentary for the comment system 10 shown in FIG. 1. This content may be referred to as extract "A" and each link L1, L2, etc. may have a corresponding extract A1, A2, etc.

Next, each extract A1, A2, etc. may be parsed for identifiable elements 204. In one embodiment, although not limited thereto, natural language processing (NLP) technology may be used. NLP is known in the art and may help to identify entities, facts and events within the content, although not limited thereto. These identified elements (e.g., entities, facts, events, etc.) may be referred to as the content's meta-data. The identifiable elements may be referred to as "E" and each extract A may have a number of elements E1, E2, etc.

A number of NLP technologies are known on the market and may be incorporated into the systems and methods disclosed herein. One such technology is called Open Callais, which provides a web service interface. Information regarding the Open Callais technology is available on the website www.opencalais.com. The Open Calais service creates semantic metadata for submitted content. Using NLP, machine learning and other methods, Open Calais analyzes text and finds the entities, facts and events within it. Tags are automatically produced so that they can be incorporated into other applications, such as the present systems and methods.

In one embodiment, although not limited thereto, the present teachings may utilize Open Callais to parse each extract A for identifiable elements E1, E2, etc. 204. The "other" work referenced by reference L1, L2, etc. may similarly be parsed to identify elements 206. The identifiable elements in the other work may be referred to as "E'" and each other work may have a number of elements E1', E2', etc. The identifiable extracts E1, E2, etc. and E1', E2', etc. may then be compared to find matches 208. By comparing the elements in this way it is possible to identify reference points in the work which the extract A refers to. For example, matching element E to E' indicates that the quoted extract is likely from the same point in the work as E'.

Although the use of parsing technology such as NLP provides an efficient search/comparison method, a comparison of phrases, sentences, etc. may also be utilized. In one embodiment, the referenced work may be divided up, parsed in sections, and the elements of each parsed section may be compared to the elements from the extract separately. Each reference point found through the search/comparison may be referred to as "R" and each extract A may have one or more reference points R1, R2, etc. The extract A1, A2, etc., link L1, L2, etc., and reference point R1, R2, etc. may then be stored 210 in the comment database 13 shown in FIG. 2, although not limited thereto.

Figure 5:
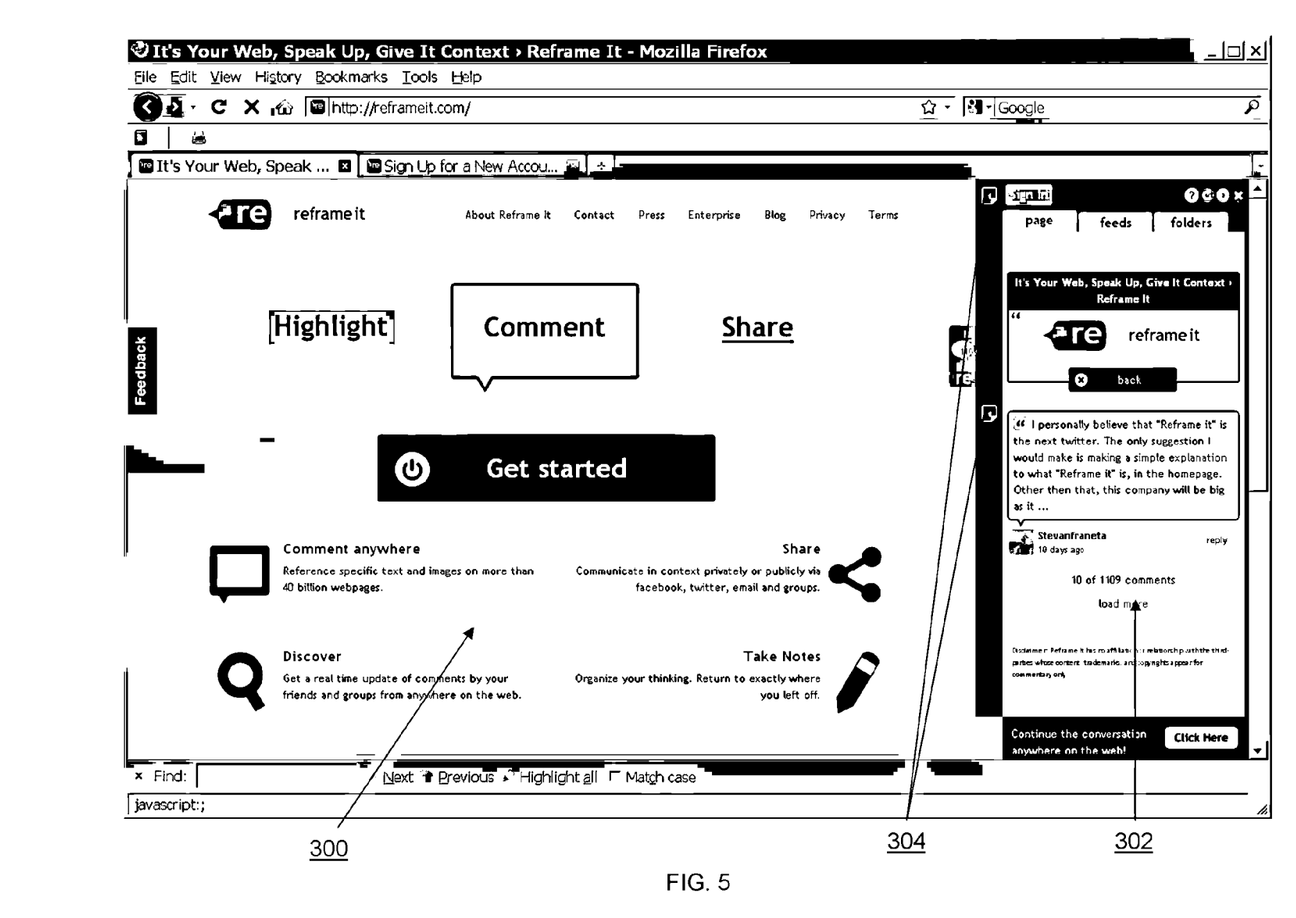
FIG. 5 is a screen shot depicting one embodiment of the graphical user interface of the application of FIG. 1.

Referring to FIG. 5, shown is a screen shot depicting one embodiment of the graphical user interface of the application 25, 25*n* of FIG. 1. As shown, a browser sidebar 302 may display comment threads that annotate specific page elements on a web page 300. The sidebar 302 may provide a clear overview (or "map") of the comments available for a given web page 300 while maintaining a strict spatial relationship between comments and the web page elements that are being referenced.

As shown, the comments may be placed at the particular reference points 304 on the web page 300. In this way, the sidebar 302 may display comments proportionally to their location on the full length of a web page 300. In one embodiment the web page elements may be highlighted when related comments are selected. In another embodiment, the sidebar may contain an indicator of the current vertical length of the browser view proportional to the full length of the web page. In still another embodiment the indicator may track and follow scroll inputs on the browser.

Comment threads that annotate a web page may also be represented by stubs (or markers) inside a browser sidebar, although not limited thereto. Selecting a stub may display the entirety of a comment thread and allow movement between a page summary and details of a particular comment thread. In one embodiment, comment threads may be vertically positioned in the sidebar proportional to their location on a web page. In another embodiment, comment threads may be opened and closed to display the primary comment or complete comment thread. In yet another embodiment, comment threads may represent the original comments and all replies made to a comment may be displayed in descending order of time posted. In still another embodiment, comment threads may be activated and opened upon mouse-over. In a further embodiment, the comment threads, when activated, may cause the page to scroll to the reference text.

Selecting page elements inside a web browser may invoke an annotated comment tool inside the sidebar. In this way, selected text may appear inside the sidebar with a text box for adding comment text, although not limited thereto. In one embodiment, selecting text immediately and automatically invokes an "add comments" tool inside the sidebar. In another embodiment, the comment tool may display a copy of all text selected on the main web page.

A two-column interface may display a bifurcated web page where each page column contains a distinct set of information about a system of meta data and content, although not limited thereto. The information in a column may be displayed according to the last system object selected in the opposing column. System objects, which may include groups, users, location tags, or any other piece of metadata, may be part of relational network of metadata on a system. In one embodiment, the information displayed in a column of a bifurcated web page may be directly relational to the last selection made in the other column. In another embodiment, the information in a column may contain links to system objects comprising both meta data and content, although not limited thereto. In yet another embodiment, the information in a column may change when a selection is made in the other column. In still another embodiment, the new column of displayed information may contain system objects directly correlated to the last selection. In a further embodiment, the left and right columns may load dynamically without page refreshes.

It may also be possible to share user comments according to any communication method including email, social media, etc. For example, the user may enter an email address into the address box and press enter to add it to the comment share list. An address book may also save email addresses for future use. Typing into the address box may also search contacts and recommend matching emails. It is also possible to use Facebook to post comments on another's wall, although not limited thereto. In this way, it is possible to automatically post your public comments to your Facebook feed so friends will see comments. Comments may appear in both friends' news feed, as well as on the user's Facebook wall. A user may also post public comments to a Twitter feed so followers will see comments. In fact, any method of communication may be used with the current system, including Blogger blog, FriendFeed, RSS feeds, etc., and the present teaching are not limited to any particular embodiment disclosed herein.

As described herein, the systems and methods may be used to determine marginalia for quotes (e.g., references, etc.) of known works. Although exemplary embodiments of various content sizes are disclosed, the present teachings are not limited to any particular embodiment. For example, content within 5 words, 20 words, 100 words, 200 words, 1 page, 5 pages, 1 paragraph, 10 paragraphs, etc., whether before or after a quote, may be used as marginalia after the quote has been identified. Similarly, content of any size may be searched within a reference to another work. One skilled in the art would appreciate that any content sizes may be used with the present teachings.

In addition, once a quote to a work is identified (e.g., a passage from Romeo and Juliet, etc.) and marginalia is determined, that marginalia may be applied to any work using (or referring) to that quote. This way, the marginalia is not limited the work where it originates, but can be applied to any number of other works automatically, although not limited thereto. The system need only identify the quoted passage in a work and then apply the determined marginalia to that work.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for searching a plurality of digital works for comments, comprising:
   a server;
   a database in electronic communication with the server;
   first quote search software executing on a computer readable medium for searching the plurality of digital works for a quote Q in proximity to a reference to another digital work L;
   first identification software executing on a computer readable medium for identifying content BA in proximity to quote Q;
   reference search software executing on a computer readable medium for searching the another work referenced by L for the corresponding quote Q in order to determine a reference point R in the work;
   first storage software executing on a computer readable medium for storing at least one of Q, L, BA and R in the database;
   second quote search software executing on a computer readable medium for searching the plurality of digital works for a quote Q' not in proximity to a reference to another digital work;
   second identification software executing on a computer readable medium for identifying content BA' in proximity to quote Q'; and
   second storage software executing on a computer readable medium for storing at least one of Q' and BA' in the database;
   wherein the first and second quote search software search for some delimiter; and
   wherein the first and second quote search software search the plurality of digital works over a network.

2. The system of claim 1 wherein the plurality of digital works are web pages.

3. The system of claim 1 wherein the delimiter is a quote character.

4. The system of claim 1 wherein the network is the Internet.

5. The system of claim 1 further comprising a comment display system for displaying comments in relation to the plurality of digital works wherein a stored comment BA is displayed in reference to a digital work L.

6. The system of claim 1 wherein the first identification software identifies thirty words before and after a quote.

7. The system of claim 1 wherein the first identification software identifies the content by rounding to the nearest full sentence.

8. The system of claim 1 wherein the first quote search software searches for quotes which are within twenty words of a reference.

9. The system of claim 1 wherein the second quote search software searches for a quote that is not within twenty words of a reference.

10. The system of claim 1 wherein the second quote search software searches within fifty words of a reference point.

11. The system of claim 1 wherein the second identification software identifies thirty words before and after a quote.

12. A method for searching a plurality of digital works for comments, comprising the steps of:
providing a server;
providing a database in electronic communication with the server;
quote searching, on a computer, the plurality of digital works for a quote Q in proximity to a reference to another digital work L;
identifying, on a computer, content BA in proximity to a quote Q;
reference searching, on a computer, the another work referenced by L for the corresponding quote Q in order to determine a reference point R in the work;
storing at least one of Q, L, BA and R in the database;
quote searching, on a computer, the plurality of digital works for a quote Q' not in proximity to a reference to another digital work;
identifying, on a computer, content BA' in proximity to quote Q'; and
storing at least one of Q' and BA' in the database;
wherein the steps of quote searching comprise searching for some delimiter; and
wherein the steps of quote searching comprise searching the plurality of digital works over a network.

13. The method of claim 12 wherein the plurality of digital works are web pages.

14. The method of claim 12 wherein the delimiter is a quote character.

15. The method of claim 12 wherein the network is the Internet.

16. The method of claim 12 further comprising the step of providing a comment display system for displaying comments in relation to the plurality of digital works wherein a stored comment BA is displayed in reference to a digital work L.

17. A comment display system, comprising:
a server;
a comment database;
a comment display application having a graphical user interface for displaying comments in relation to a web page;
first quote search software executing on a computer readable medium for searching a plurality of web pages for a quote Q in proximity to a reference to another digital work L;
first identification software executing on a computer readable medium for identifying content BA in proximity to a quote Q;
reference search software executing on a computer readable medium for searching the another work referenced by L for the corresponding quote Q in order to determine a reference point R in the work;
first storage software executing on a computer readable medium for storing at least one of Q, L, BA and R in the comment database;
second quote search software executing on a computer readable medium for searching the plurality of web pages for a quote Q' not in proximity to a reference to another digital work;
second identification software executing on a computer readable medium for identifying content BA' in proximity to quote Q'; and second storage software executing on a computer readable medium for storing at least one of Q' and BA' in the comment database;
wherein the first and second quote search software search for a quote character;
wherein the first and second quote search software search the plurality of web pages over the Internet; and
wherein the comment display application displays a stored comment BA in reference to a digital work L.

18. A system for searching a plurality of digital works for comments, comprising:
a server;
a database in electronic communication with the server;
reference search software executing on a computer readable medium for searching the plurality of digital works for a reference to another digital work L;
first identification software executing on a computer readable medium for identifying content A in proximity to a reference L;
content parsing software executing on a computer readable medium for parsing content A for identifiable elements E;
work parsing software executing on a computer readable medium for parsing referenced work L for identifiable elements E';
comparison software executing on a computer readable medium for comparing elements E and E' in order to determine a reference point R in referenced work L;
first storage software executing on a computer readable medium for storing at least one of A, L, and R in the database;
quote search software executing on a computer readable medium for searching the plurality of digital works for a quote Q' not in proximity to a reference to another digital work;
second identification software executing on a computer readable medium for identifying content BA' in proximity to quote Q'; and
second storage software executing on a computer readable medium for storing at least one of Q' and BA' in the database;
wherein the quote search software searches for some delimiter;
wherein the quote search software searches the plurality of digital works over a network; and
wherein the reference search software searches the plurality of digital works over a network.

19. The system of claim 18 wherein the plurality of digital works are web pages.

20. The system of claim 18 wherein the reference search software searches for web links.

21. The system of claim 18 wherein the network is the Internet.

* * * * *